US010565481B2

(12) United States Patent
Kodimer et al.

(10) Patent No.: US 10,565,481 B2
(45) Date of Patent: Feb. 18, 2020

(54) SYSTEM AND METHOD FOR ADDITIVE DEVICE POLICY CONTROL OF MULTIFUNCTION PERIPHERALS (71) Applicants: Kabushiki Kaisha Toshiba, Minato-ku (JP); Toshiba TEC Kabushiki Kaisha, Shinagawa-ku (JP)

(72) Inventors: Marianne Kodimer, Huntington Beach, CA (US); Silvy Wilson, Rancho Santa Margarita, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/213,506

(22) Filed: Dec. 7, 2018

(65) Prior Publication Data
US 2019/0108425 A1   Apr. 11, 2019

Related U.S. Application Data (63) Continuation of application No. 15/680,775, filed on Aug. 18, 2017, now abandoned.

(51) Int. Cl.
G06F 3/12       (2006.01)
G06K 15/02      (2006.01)
H04N 1/00       (2006.01)
G06K 15/00      (2006.01)

(52) U.S. Cl.
CPC ....... *G06K 15/1805* (2013.01); *G06K 15/402* (2013.01); *H04N 1/0097* (2013.01); *H04N 1/00482* (2013.01); *H04N 1/00973* (2013.01); *H04N 2201/0039* (2013.01); *H04N 2201/0094* (2013.01)

(58) Field of Classification Search
CPC ............. G06K 15/1805; G06K 15/402; H04N 1/00482; H04N 1/00973; H04N 1/0097; H04N 2201/0094; H04N 2201/0039; G06F 3/1224; G06F 3/1225; G06F 3/1229; G06F 3/123
See application file for complete search history.

(56) References Cited

U.S. PATENT DOCUMENTS

| 7,689,676 B2 * | 3/2010 | Vinberg | G06F 8/61 709/220 |
| 2012/0044534 A1 * | 2/2012 | Ichikawa | G06F 3/1204 358/1.15 |
| 2012/0281251 A1 * | 11/2012 | Salgado | G06F 3/1204 358/1.15 |

* cited by examiner

*Primary Examiner* — Kent Yip
(74) *Attorney, Agent, or Firm* — Ulmer & Berne LLP (57) ABSTRACT A system and method multifunction peripheral policy-based configuration includes a processor and a memory storing a policy data for each of a plurality of multifunction peripheral device configuration policies. A selectable list of the device policies is displayed. A user selects one or more device configuration policies from the list, and the processor tests selected device configuration policies. Policies are identified as single or additive policy types. Selected policies are added when not identified as a single policy type.

17 Claims, 8 Drawing Sheets

All Devices

Device Actions ▽ | 📄 ▷ | 🔄 Refresh Device Data

Devices (5432) | Inactive (4807)

| | Serial Number | Model | Firmware | Customer | Policy |
|---|---|---|---|---|---|
| ☐ | C7LD32244 | ESTUDIO2555C | T212SF0W2107 | J7 ARCHITECTURE INC | |
| ☑ | CELD53057 | ESTUDIO457 | T330SF0W1253 | ARCH HEALTH PARTNERS | (4) 📄 Toner Near Empty ALL TBS_CANV |
| ☐ | C7FD69289 | ESTUDIO2555C | T212SF0W2153 | EAST COUNTY MORTUARY INC | |
| ☐ | C7AE40145 | ESTUDIO4555C | T212SF0W2150 | HOAG MEMORIAL HOSPITAL | |
| ☐ | C7AE40177 | ESTUDIO4555C | T212SF0W2171 | PINNACLE HOTELS USA INC | (4) 📄 Toner Near Empty ALL TBS_CANV |
| ☐ | C7AE40180 | ESTUDIO4555C | T212SF0W2171 | COUNTY OF PLACER CA | |
| ☐ | C7AE40190 | ESTUDIO4555C | T212SF0W2153 | BUCKLEY PATCHEN RIEMAN & HALL | |
| ☐ | C7AE40260 | ESTUDIO4555C | T212SF0W2171 | REACH PROJECT INC | |
| ☐ | C7AE39839 | ESTUDIO3055C | T212SF0W2171 | COUNTY OF SACRAMENTO CA | |
| ☐ | C7AE39846 | ESTUDIO3055C | T212SF0W2171 | ISUZU NORTH AMERICA CORPORATION | |

(4) 📄 Toner Near Empty ALL TBS_CANV

Remove Policies

Check the policies you want to remove from the selected device.

☐ Remove All Policies

☑ Backup_DeviceAlert Group  (Applied by Htran@yahoo.com)
  ▶ Details

Security Policy
  Ada_Security_Policy  ▶ Details

Backup Policy
  R40211 - Backup 1 day  ▶ Details

Device Error Processing Policy
  Ada_Test_Policy_DEP  ▶ Details

☐ Custom Policy (Applied by Htran@yahoo.com)
  Toner Empty Warning  ▶ Details

Cancel    OK

FIG. 8

SYSTEM AND METHOD FOR ADDITIVE DEVICE POLICY CONTROL OF MULTIFUNCTION PERIPHERALS

TECHNICAL FIELD

This application relates generally to policy-based operation of multifunction peripherals. This application relates more particularly to user-programmable policy-based operation of multifunction peripherals with both single and additive or multi-device policies.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions.

MFPs have evolved from mere document processing devices to devices that include network and direct data communication with other devices such as tablets, smart phones, workstations, servers and other MFPs. MFPs monitor a large number of machine attributes, including paper usage, copy count, toner level, environmental conditions, error conditions and the like. An MFP may be programmed to periodically contact a network server and check for software, including firmware, updates. An MFP may maintain usernames, passwords and device usage credentials for a large number of users. An MFP may be tasked with periodically generating and reporting usage or error reports. Many other MFP functions may be enabled or customized for any particular MFP.

MFP configuration can be done on each individual device. This can be difficult, particularly when a large number of MFPs are in concurrent service at a company. It would be cost and time prohibitive if a technician had to physically approach and configure many MFPs which may be scattered about many different locations. This can be particularly wasteful when each machine is to be configured in the same or similar ways. More recently, MFP configuration can be done via a network connection. By way of particular example, Toshiba TEC MFP devices are configurable via an eCC web interface. Device configuration with eCC can be completed by setting device policies. Policies are used to create a near infinite number of attributes to monitor and configure a MFP or fleet of MFPs. Policies are organized into categories, and templates are provided to make the configuration of a policy fairly intuitive. Policy categories for eCC include settings for:

Firmware Update
Device Error Processing
Backup
Device Communication
Custom Settings
Additional policy categories Data for each MFP is compared to its policy settings. A policy includes a list of parameters (rules) for incoming data as well as functions and actions to perform based on the data. When data falls outside the parameters of the policy rule, it is a policy violation. When a policy violation occurs, an alert is triggered for the MFP. Alerts may commence policy action such as:

a. The violation is displayed on the Devices page on the eCC portal.

b. If the policy was written to trigger actions, the system executes these actions.

Communication sequences can be set, such as to be timed at off-hours, by a policy. By way of example, a policy may further dictate that the following sequence occurs on the first day of every month:

Registration
Check for updates
Download updates (skip if none)
Execute updates (skip if none)
Send updated data set In the event of alerts, an MFP policy may by way of example initiate communications to a cloud server in near real time. The policy may direct the MFP to send the following:

MFP Identification (security token)
Error Code
Short Description of the Alert
Send updated data set It will be seen from the forgoing that MFP device configuration that setting device policies provides a powerful, efficient and effective tool for device administration.

SUMMARY

In accordance with an example embodiment of the subject application, a system and method multifunction peripheral policy-based configuration includes a processor and a memory storing a policy data for each of a plurality of multifunction peripheral device configuration policies. A selectable list of the device policies is displayed. A user selects one or more device configuration policies from the list, and the processor tests selected device configuration policies. Policies are identified as single or additive policy types. Selected policies are added when not identified as a single policy type.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As noted above, policy-based control of MFPs provides for flexible and powerful device configuration options. MFP devices are currently equipped with an embedded software and user interface that allows an administrator or service technician to configure the device. Using the eCC application, these configurations and further monitoring and control of the system are completed via policies. The policy creation method relies on manual input of settings and rules. There are a variety of policy categories including error codes and device settings. Within each policy category, a policy is created by defining a set of rules or settings. Once applied to a device, the policy settings will be applied and/or an event will be triggered when a specified value or condition is reached. One concern with the implementation is when only one policy object can be applied to the device at a time where a policy object is either a single policy or a group of policies that contains many policies. Current systems do not facilitate configuration allowing policies to be added to devices without replacing the existing policies.

The subject application teaches example embodiments wherein a device or service cloud provides an ability to add or remove selected, individual policies to a fleet of devices without needing to remove or replace the existing policies applied. This enables a service technician to configure a device and subsequently apply and remove individual policies to one or more devices to achieve a temporal method of monitoring devices without disrupting the current policy configuration. Additive policies concept will allow users to add policies to devices with existing policies while not necessarily removing the existing policies. Similarly, the user can remove individual policies without having to remove the entire policy set.

Figure 1:
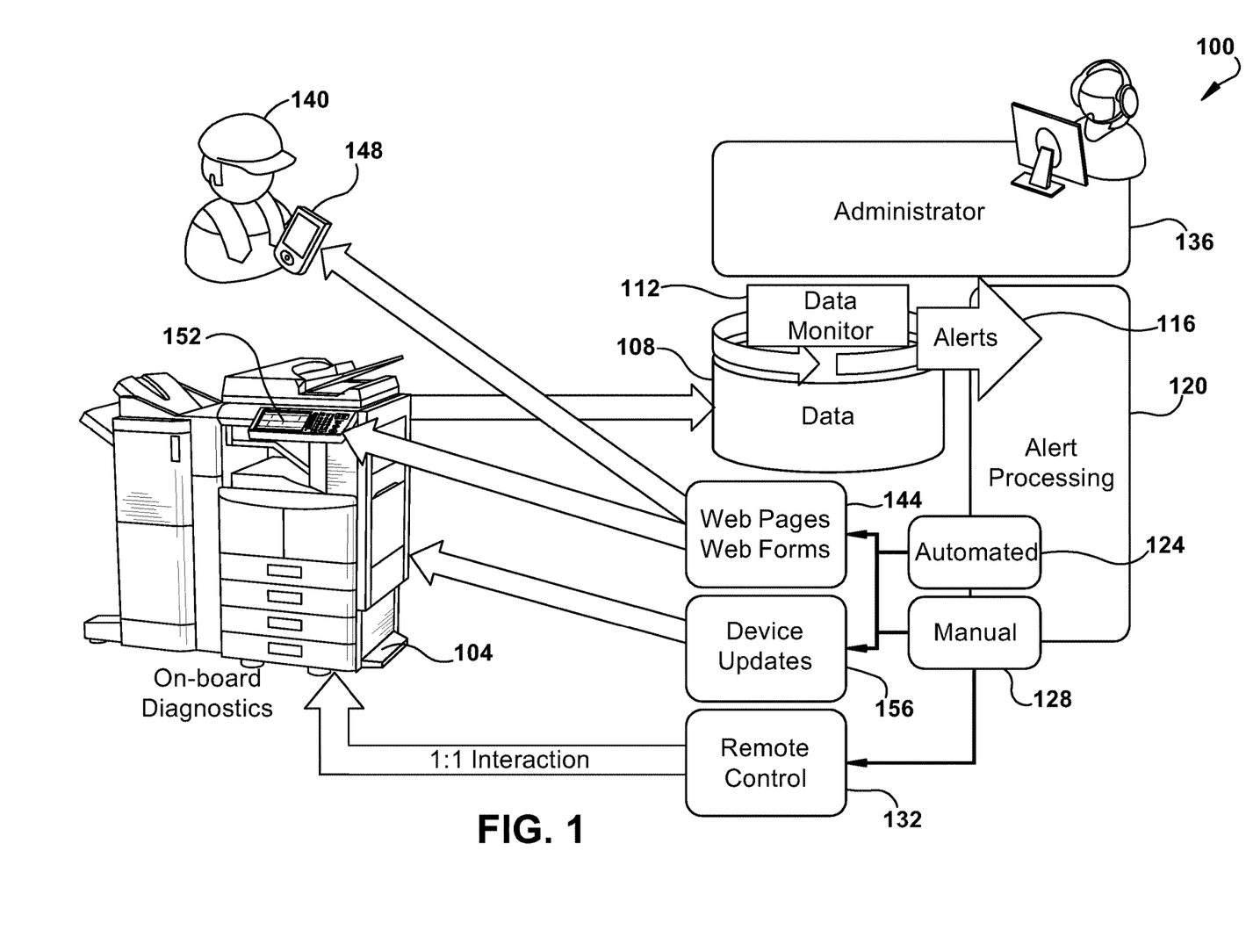
FIG. 1 an example embodiment of a policy setting and updating system.

In accordance with the subject application, FIG. 1 illustrates an example embodiment of a policy setting and updating system 100 for one or more MFPs as exemplified by MFP 104. Device data from MFP 104 is available from data storage 108 working with an administrative device suitably comprised of a cloud sever or functionality embedded in an MFP itself. A processor monitors machine data at block 112, which monitoring generates alerts 116 which are processed at block 120. Alerts are processed in accordance with automated policies 124 or manual control 128, suitably by remote control 132 by an administrator 136 via a cloud service. Automated, policy-based control 124 is suitably directed by a service technician 140 via web interface 144 which may be accessed by a service technician's device 148 or on MFP interface 152. Additional alerts suitably process device updates 156.

Figure 2:
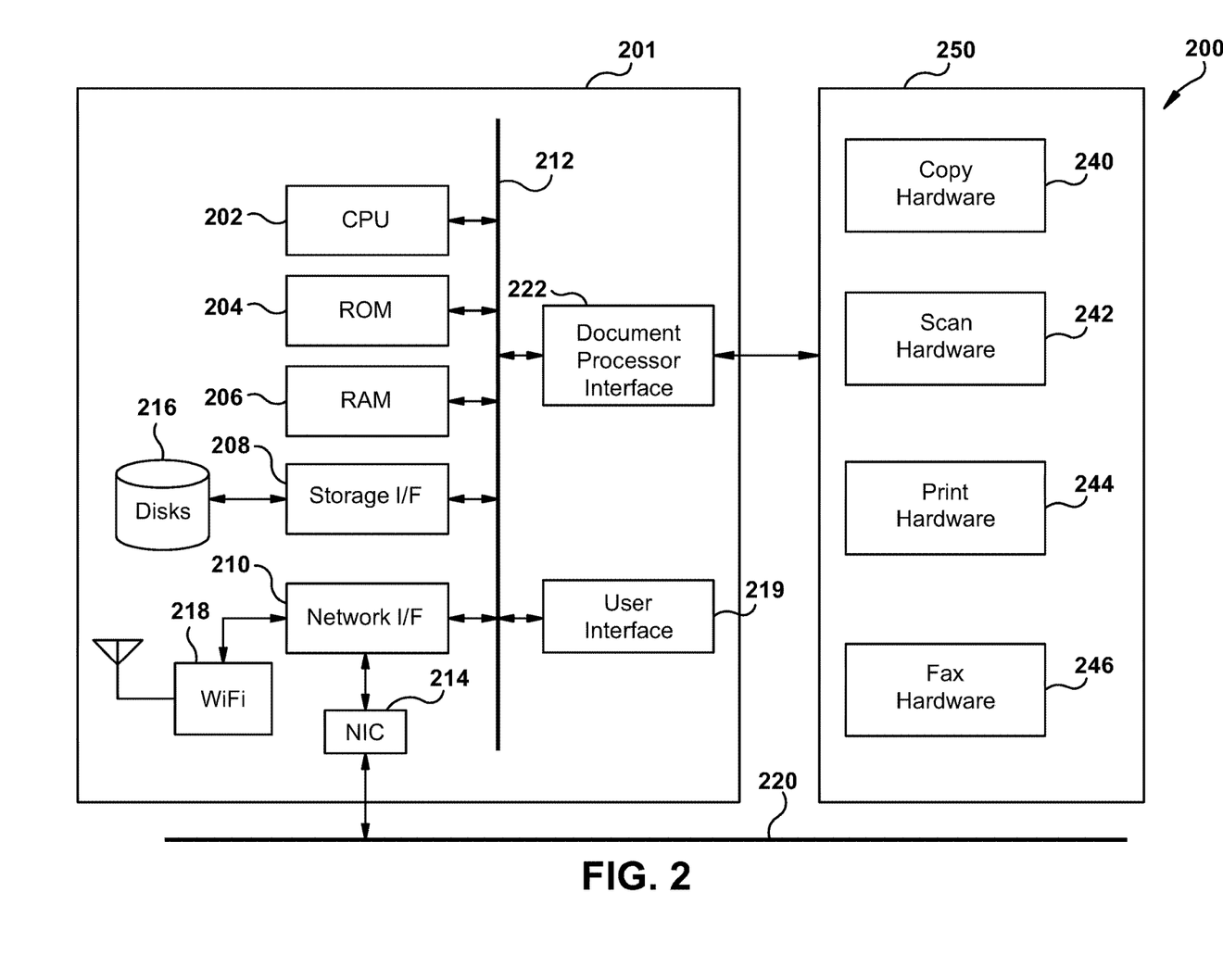
FIG. 2 is an example embodiment of a document rendering system.

Turning now to FIG. 2 illustrated is an example embodiment of a document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like. Processor 202 is also in data communication with one or more sensors which provide data relative to a state of the device or associated surroundings, such as device temperature, ambient temperature, humidity, device movement and the like.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

A hardware monitor suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
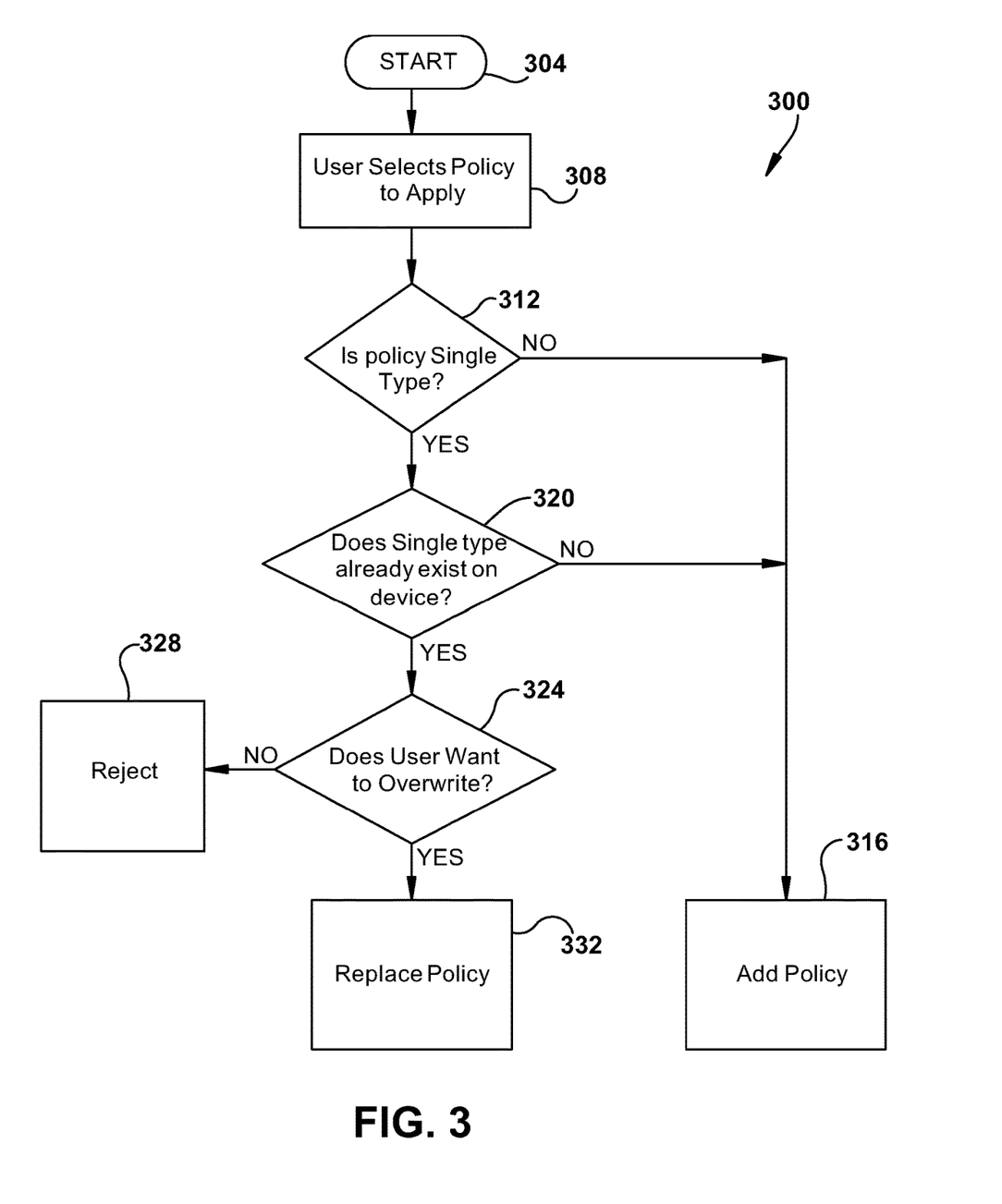
FIG. 3 is a flowchart of an example embodiment of operations for accomplishing implementation of policies.

Referring next to FIG. 3, illustrated is a flowchart 300 an example embodiment of operations suitable for accomplishing implementation of policies that may be single or multiple in nature. The process commences at block 304 and a user, such as an administrator or service technician, selects a policy to apply at block 308. Policies are suitably listed in a selectable format on a device display as will be detailed further below. When a policy is selected, it is tested at block 312 to determine if it is a single type policy. If not, the policy is an additive type policy and may be added to the MFP configuration at block 316. If policy is a single type policy, then a test is made at block 320 to determine if one already exists on for the device. If not, the new policy is added at block 316. If so, the user is prompted at block 324 to determine if they wish the existing policy to be overwritten. If so, the existing policy is replaced at block 332. If not, the new policy is rejected at block 328.

Figure 4:
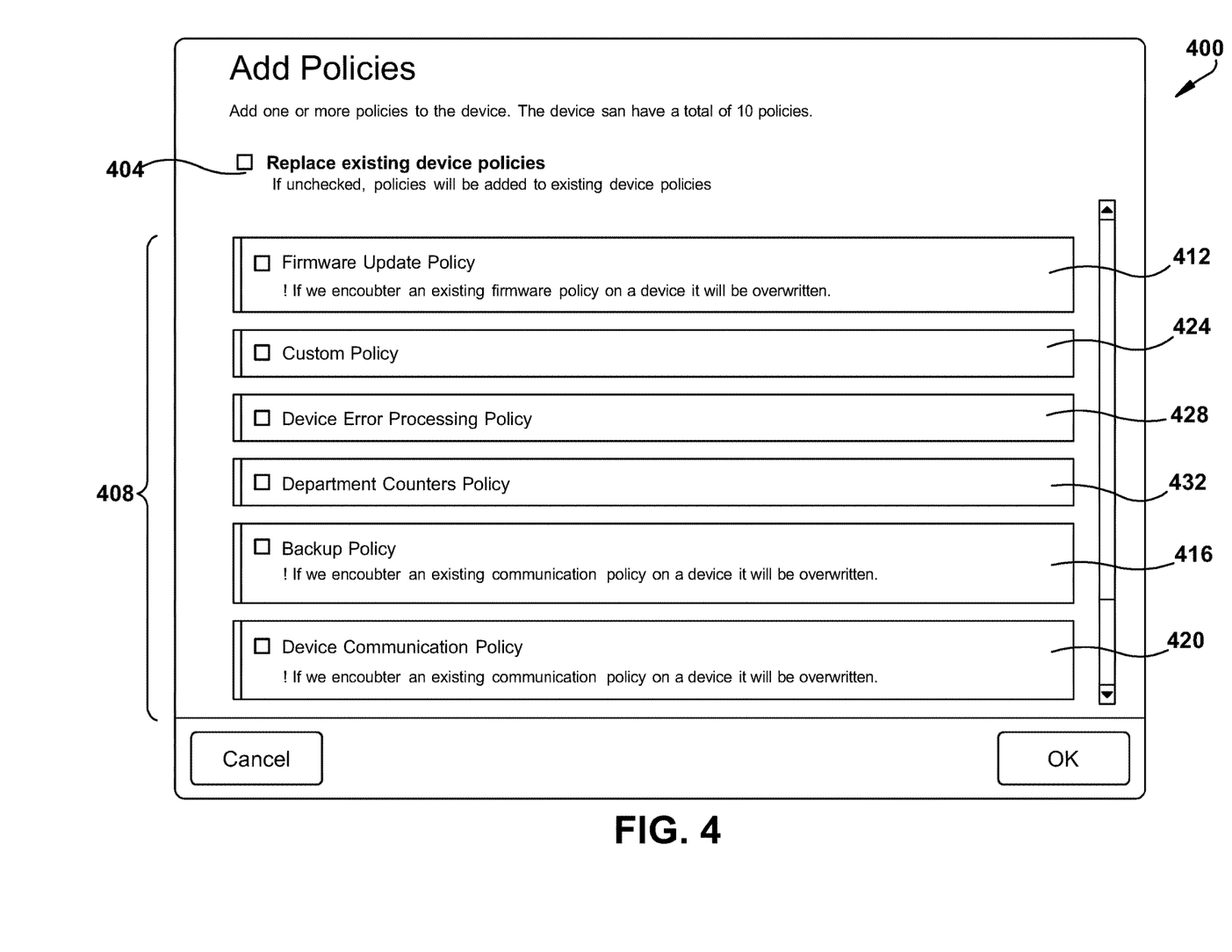
FIG. 4 is an example embodiment of a user interface screen for policy addition.

FIG. 4 illustrates an example embodiment of a user interface screen 400 for policy addition. User selection of box 404 dictates whether new policies will replace existing policies. A listing 408 of existing device policies is generated on interface 400. Firmware update policy 412, backup policy 416 and communication policy 420 are single type policies and the user is warned that, if selected, any existing, corresponding policy will be overwritten. Custom policy 424, device error processing policy 428 and department counters policy 432 are additive, and when selected, can be added without replacement of an existing policy.

Figure 5:
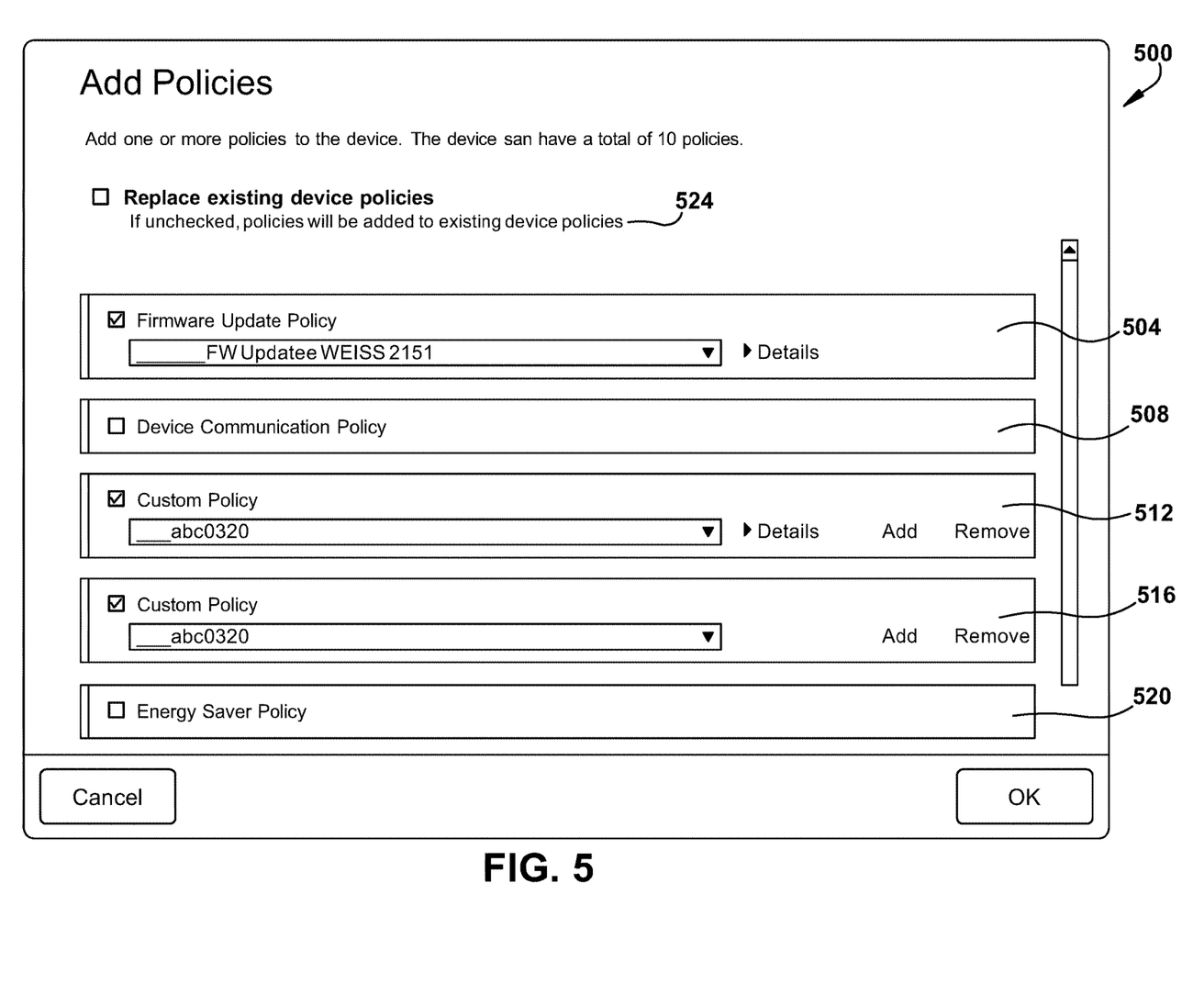
FIG. 5 is an example embodiment of a user interface screen for policy selection.

FIG. 5 illustrates an example embodiment of a user interface screen 500 suitably illustrating select-ability of firmware update policy 504, device communication policy 508, custom policies 512 and 516, and energy saver policy 520. A user can select to replace existing device policies at 524. Firmware update policy 504 is a single type policy which will result in a replacement if 524 is selected, or a discarding if not. Custom policies 512 and 516 are additive and a user can select whether they should be added or removed, thus providing for multiple additions of additive or multi type policies.

Figure 6:
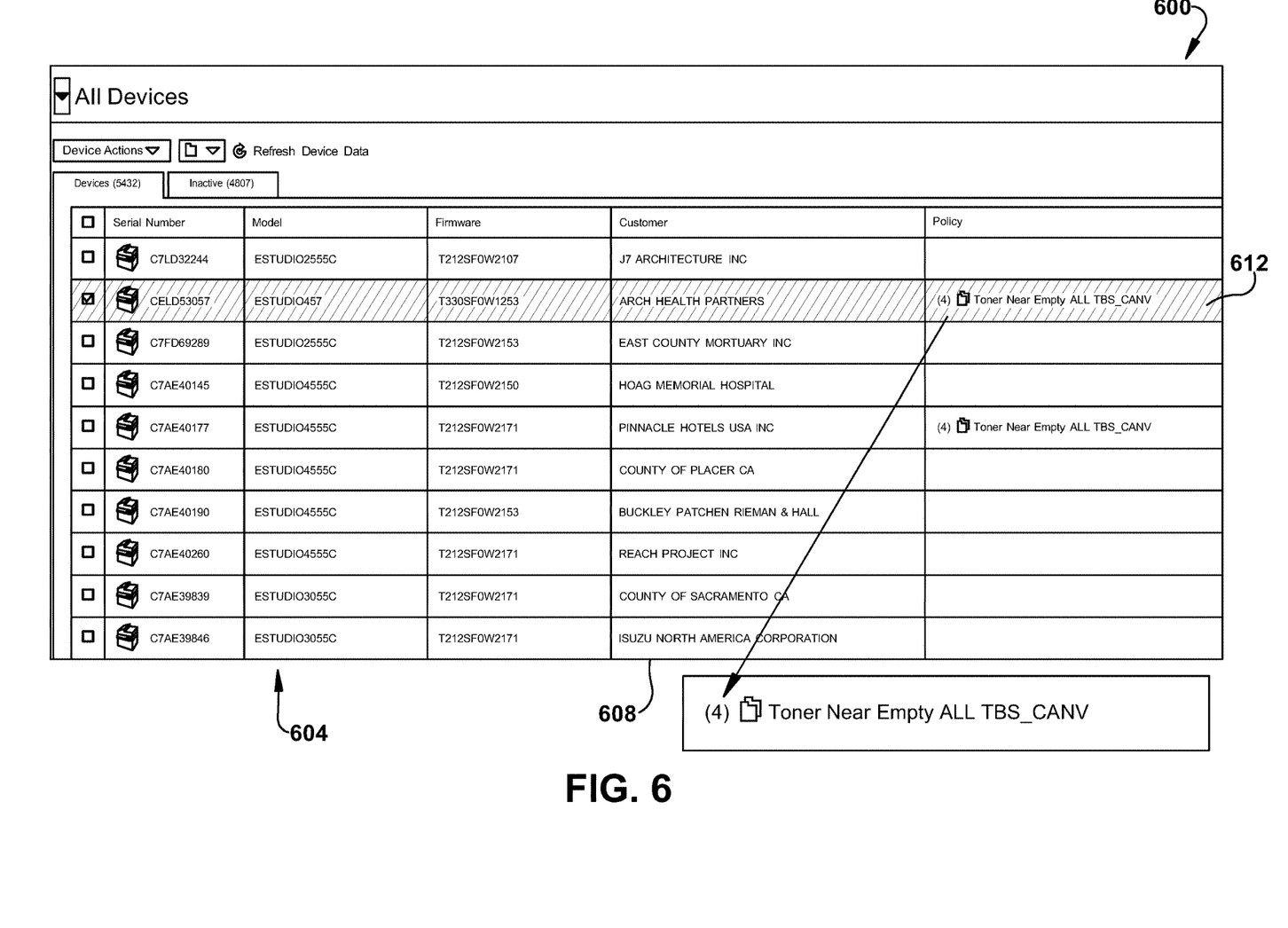
FIG. 6 is an example embodiment of a user interface for presentation of a listing of additive policies.

FIG. 6 is an example embodiment of a user interface 600 for presentation of a listing of additive policies for a fleet of similar, managed devices 604 for various customers 608. In the illustrated example, a user selection of policy 612 provides a toner warning policy to a device associated with Arch Health Partners.

Figure 7:
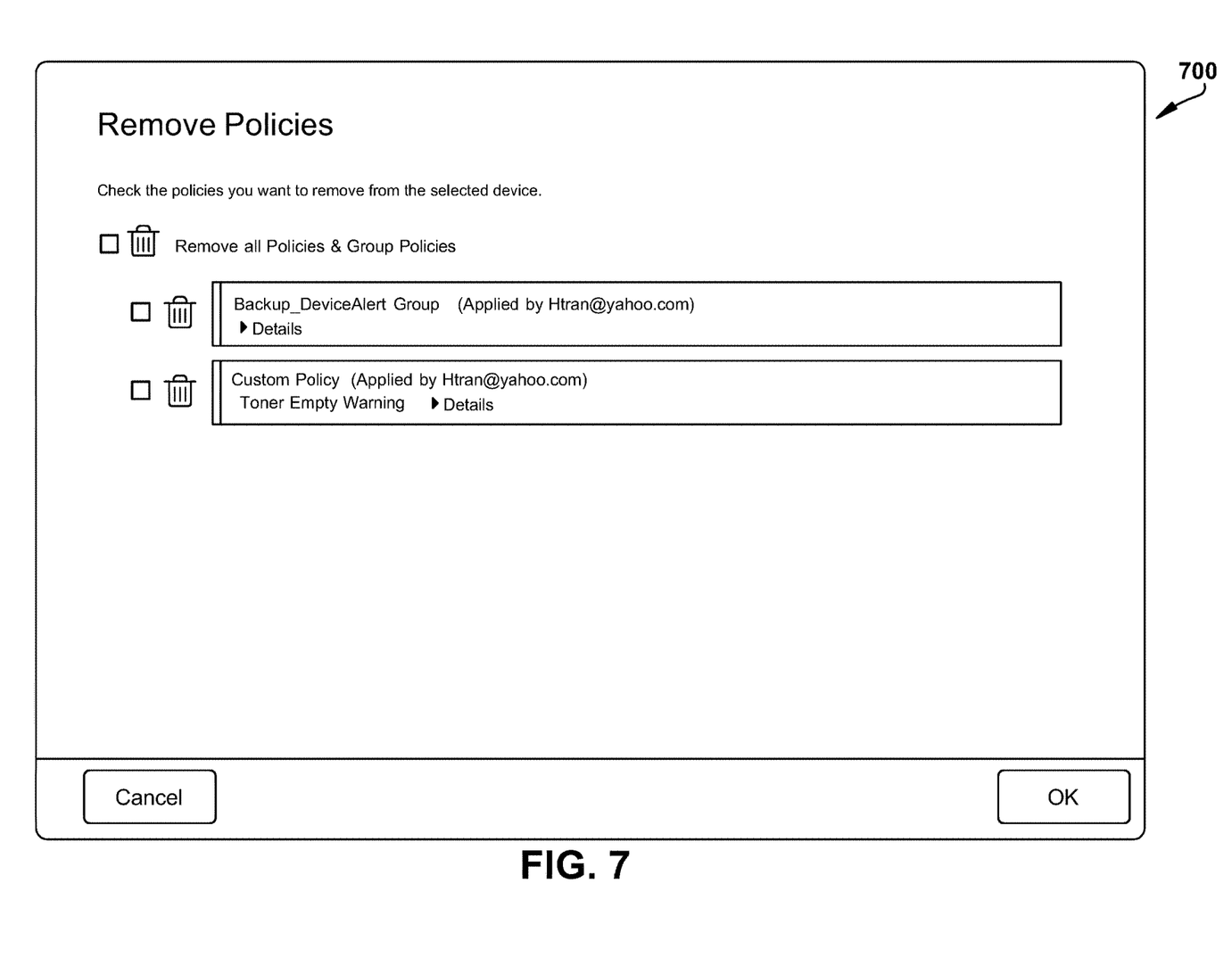
FIG. 7 is an example embodiment of a user interface for selective removal of policies from devices.

FIG. 7 illustrates an example embodiment of a user interface 700 for selective removal of policies from devices.

Figure 8:
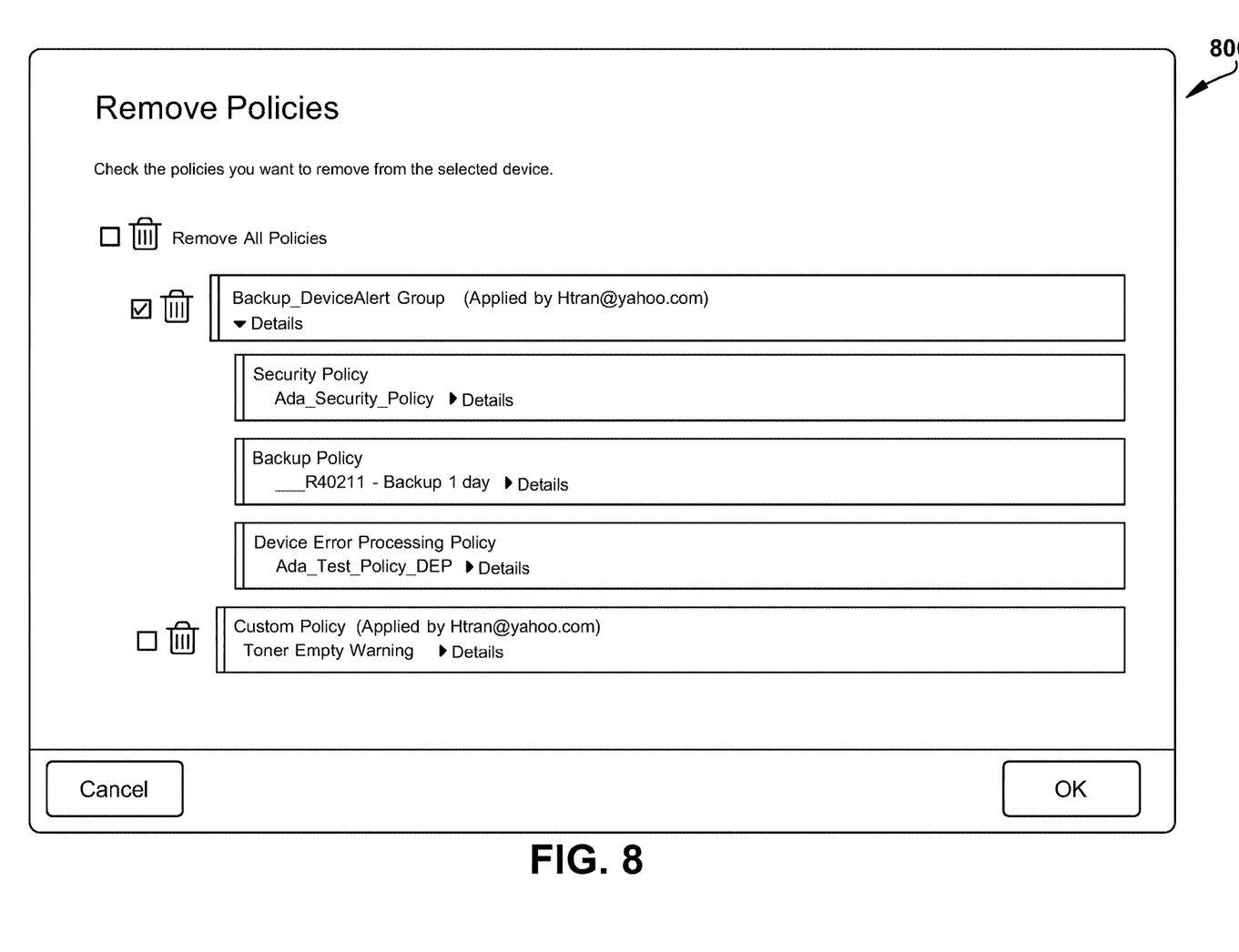
FIG. 8 is an example embodiment of a user interface for selecting removal of a group policy.

FIG. 8 illustrates an example embodiment of a user interface 800 for selecting removal of a group policy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral policy-based configuration system comprising:
   a processor;
   a memory configured to store a policy data for each of a plurality of multifunction peripheral device configuration policies, the policy data including single type policies and multiple type policies, each multiple type policy comprised of a plurality of related policies;
   a user interface configured to display a policy list corresponding to a selectable list of the device configuration policies; and
   the user interface configured to receive a user selection of a selected device configuration policy chosen from the list,
   wherein the processor is configured to test the selected device configuration policy;
   wherein the processor is further configured to identify the selected device configuration policy as a single policy type,
   wherein the processor is further configured to add the selected device configuration policy to a policy previously installed on a multifunction peripheral when the selected device configuration policy is not identified as a single policy type; and
   wherein the processor is further configured to replace an existing device policy when the selected device configuration policy is identified as a single policy type.

2. The system of claim 1 wherein the processor is further configured to reject adding the selected device configuration policy when the selected device configuration policy is identified as a single policy type.

3. The system of claim 1
   wherein the processor is further configured to generate a user prompt on the user interface corresponding to identification of the selected device configuration policy as a single policy type, and
   wherein the processor is further configured to selectively replace the existing device policy with the selected device configuration policy in accordance with a user response to a generated user prompt.

4. The system of claim 1 further comprising an input configured to receive a custom device policy into the memory.

5. The system of claim 1 wherein the processor is further configured to add the selected device configuration policy to a plurality of multifunction peripherals via a network interface.

6. The system of claim 1 wherein the processor is further configured to generate a categorized, selectable list of device configuration policies as a subset of the selectable list of the device configuration policies, which subset is comprised of single type policies or multiple type policies in accordance with identification of the selected device configuration policy.

7. A method of multifunction peripheral policy-based configuration comprising:
   retrieving, from a memory, policy data for each of a plurality of multifunction peripheral device configuration policies the policy data including single type policies and multiple type policies, each multiple type policy comprised of a plurality of related policies;
   displaying a policy list corresponding to a selectable list of the device configuration policies on an associated user interface;
   receiving, via a user interface, a user selection of a selected device configuration policy chosen from the list;
   testing the selected device configuration policy via a processor;
   identifying the selected device configuration policy as a single policy type in accordance with the testing;
   adding the selected device configuration policy to the multifunction peripheral when the selected device configuration policy is not identified as a single policy type; and
   replacing an existing device policy when the selected device configuration policy is identified as a single policy type.

8. The method of claim 7 further comprising rejecting adding the selected device configuration policy when the selected device configuration policy is identified as a single policy type.

9. The method of claim 7 further comprising:
   generating a user prompt on the user interface corresponding to identification of the selected device configuration policy as a single policy type; and
   selectively replacing the existing device policy with the selected device configuration policy in accordance with a user response to a generated user prompt.

10. The method of claim 7 further comprising receiving a custom device policy into the memory.

11. The method of claim 7 further comprising adding the selected device configuration policy to a plurality of multifunction peripherals via a network interface.

12. The method of claim 7 further comprising generating a categorized, selectable list of device configuration policies as subset of the selectable list of the device configuration policies, which subset is comprised of single type policies or multiple type policies in accordance with identification of the selected device configuration policy.

13. A multifunction peripheral comprising:
   an intelligent controller including a processor and memory, the controller configured for operation of at least one device processing operation,
   the memory configured to store a plurality of device policy settings, and
   the controller further configured to operate the at least one device processing operation in accordance with at least one active policy setting; and
   a user interface configured to receive selection data corresponding to a new device policy,
   wherein the controller is further configured to test the new device configuration policy,
   wherein the controller is further configured to determine if the new device configuration policy is a multiple policy type such that it affects a plurality of related policies,
   wherein the controller is further configured to operate the at least one device processing operation in accordance with the at least one active policy setting and the new device configuration policy when the new device configuration policy is determined to be a multiple policy type;
   wherein the controller is further configured to replace the at least one active policy setting with the new device configuration policy when the new device configuration policy is determined to be a single policy type.

14. The multifunction peripheral of claim 13 wherein the controller is further configured for operation of a document processing engine in accordance with the active device policy and the new device configuration policy.

15. The multifunction peripheral of claim 13 wherein the controller is further configured for operation of a document processing engine in accordance with the new device configuration policy.

16. The multifunction peripheral of claim 13 wherein the controller is further configured for operation of device maintenance operations in accordance with the at least one active policy setting and the new device configuration policy.

17. The multifunction peripheral of claim 14 wherein the controller is further configured to generate a policy selection list on an associated user interface prompting an associated user for the selection data.

* * * * *